US010836364B2

(12) United States Patent
Asano et al.

(10) Patent No.: US 10,836,364 B2
(45) Date of Patent: Nov. 17, 2020

(54) VEHICLE CONTROL DEVICE

(71) Applicant: ADVICS CO., LTD., Kariya (JP)

(72) Inventors: Masayuki Asano, Nagoya (JP);
Hiroyuki Ando, Nagoya (JP); Yukio
Mori, Nagoya (JP)

(73) Assignee: ADVICS CO., LTD., Kariya (JP)

( * ) Notice: Subject to any disclaimer, the term of this
patent is extended or adjusted under 35
U.S.C. 154(b) by 204 days.

(21) Appl. No.: 16/081,156

(22) PCT Filed: Mar. 15, 2017

(86) PCT No.: PCT/JP2017/010347
§ 371 (c)(1),
(2) Date: Aug. 30, 2018

(87) PCT Pub. No.: WO2017/159717
PCT Pub. Date: Sep. 21, 2017

(65) Prior Publication Data
US 2019/0023240 A1 Jan. 24, 2019

(30) Foreign Application Priority Data
Mar. 18, 2016 (JP) ................. 2016-055752

(51) Int. Cl.
*B60T 7/12* (2006.01)
*B60W 40/00* (2006.01)
(Continued)

(52) U.S. Cl.
CPC ................... *B60T 7/12* (2013.01);
*B60T 8/17* (2013.01); *B60W 10/04* (2013.01);
*B60W 10/08* (2013.01);
(Continued)

(58) Field of Classification Search
CPC ..... B60T 7/00; B60T 7/12; B60T 8/00; B60T
8/17; B60W 10/04; B60W 10/08;
(Continued)

(56) References Cited

U.S. PATENT DOCUMENTS 8,868,311 B2 * 10/2014 Schwindt .................. B60T 7/22
701/93
9,205,843 B2 * 12/2015 Sannodo ........... B60W 50/0097
(Continued)

FOREIGN PATENT DOCUMENTS

JP      2010-18239 A       1/2010
WO   WO 2012/098680 A1    7/2012

OTHER PUBLICATIONS

International Search Report dated Jun. 13, 2017 in PCT/JP2017/010347 filed Mar. 15, 2017.

*Primary Examiner* — Yonel Beaulieu
(74) *Attorney, Agent, or Firm* — Oblon, McClelland,
Maier & Neustadt, L.L.P.

(57) ABSTRACT

A prediction unit predicts a limit time at which a limit request value corresponding to a minimum acceleration or torque is reached when a vehicle is decelerated with only a first deceleration control by a drive device based on change over time of a request value indicating a degree of longitudinal direction vehicle acceleration. A mode determination unit selects one of: a first mode in which only the first control is executed, and before the limit time is reached, in addition to the first control, a second deceleration control is started by a braking device; or a second mode in which only the first control is executed, and before the limit time is reached, in addition to the first control, a braking preparation control is started. A calculation unit calculates an operation amount of the drive and braking devices based on the request value in accordance with the determined mode.

8 Claims, 4 Drawing Sheets

(51) Int. Cl.
*B60T 8/17* (2006.01)
*B60W 10/04* (2006.01)
*B60W 10/08* (2006.01)
*B60W 30/00* (2006.01)
*B60W 30/16* (2020.01)
*B60W 40/107* (2012.01)
*B60W 10/184* (2012.01)
*B60W 10/18* (2012.01)
*B60W 30/18* (2012.01)

(52) U.S. Cl.
CPC .......... *B60W 10/18* (2013.01); *B60W 10/184* (2013.01); *B60W 40/107* (2013.01); *B60W 30/18109* (2013.01)

(58) Field of Classification Search
CPC .... B60W 10/10; B60W 10/18; B60W 10/184; B60W 40/09; B60W 40/10; B60W 40/105; B60W 40/107; B60W 30/16
See application file for complete search history.

(56) References Cited

U.S. PATENT DOCUMENTS

| | | | |
|---|---|---|---|
| 9,238,412 B2* | 1/2016 | Kidston | B60L 7/26 |
| 9,327,732 B1* | 5/2016 | Miller | B60W 30/18136 |
| 9,371,061 B2* | 6/2016 | Kim | B60L 7/18 |
| 9,592,804 B2* | 3/2017 | Beever | B60K 31/00 |
| 10,207,688 B2* | 2/2019 | Beever | B60K 31/00 |
| 10,220,827 B2* | 3/2019 | Kim | B60W 30/143 |
| 10,471,938 B2* | 11/2019 | Das | B60W 30/18109 |
| 2010/0009807 A1 | 1/2010 | Umakoshi et al. | |
| 2013/0304344 A1 | 11/2013 | Abe | |
| 2015/0006052 A1* | 1/2015 | Sannodo | B60W 40/107 701/70 |
| 2019/0023240 A1* | 1/2019 | Asano | B60T 7/12 |

* cited by examiner

VEHICLE CONTROL DEVICE

CROSS-REFERENCE TO RELATED APPLICATIONS

This application is a United States national stage application of International Application No. PCT/JP2017/010347, filed Mar. 15, 2017, which designates the United States, and claims the benefit of foreign priority to Japanese Patent Application No. 2016-055752, filed Mar. 18, 2016, and the entire contents of each of the above applications are hereby incorporated herein by reference in entirety.

TECHNICAL FIELD

The present disclosure relates to a vehicle control device.

BACKGROUND ART

Conventionally, a vehicle control device has been known. In the vehicle control device, deceleration of the vehicle in automatic driving control that does not depend on a driving operation is realized by control for reducing acceleration by a drive device and control for increasing the deceleration by a braking device.

CITATION LIST

Patent Literature

PTL 1: JP-A-2010-18239

DISCLOSURE OF INVENTION

Technical Problem

In the above background art, the deceleration by the braking device is increased after the acceleration by the drive device starts being reduced and the reduction of the acceleration by the drive device is terminated. In this case, due to a response delay of the braking device or the like, a time lag occurs between the time at which the reduction of the acceleration by the drive device is terminated and the time at which the deceleration by the braking device starts being reduced, which possibly causes a relatively rapid change in the deceleration (the acceleration) of the vehicle.

In view of the above, one of purposes of the present disclosure is to obtain a vehicle control device capable of suppressing a rapid change in deceleration (acceleration) in deceleration control by automatic driving, for example.

Solution to Problem

A control device for a vehicle in the present disclosure is, for example, a control device for a vehicle capable of executing first deceleration control, in which the vehicle is decelerated by a drive device, second deceleration control, in which the vehicle is decelerated by a braking device, and braking preparation control, in which the braking device is brought into a preparation state, in the case where deceleration control of the vehicle is executed in accordance with a reduction in a request value indicative of a degree of longitudinal acceleration of the vehicle, and includes: a prediction unit that predicts limit time at which the request value reaches a limit request value corresponding to lower limit acceleration or torque that can be achieved by the first deceleration control when the vehicle is decelerated by the first deceleration control only on the basis of a change of the request value over time; a control mode determination unit that determines a control mode on the basis of the request value, the control mode determination unit selecting, as the control mode, one of a first control mode and a second control mode, in the first control mode, only the first deceleration control being executed and the second deceleration control being initiated in addition to the first deceleration control before arrival of the limit time, and in the second control mode, only the first deceleration control being executed and the braking preparation control being initiated in addition to the first deceleration control before the arrival of the limit time; and an operation amount calculation unit that calculates an operation amount of each of the drive device and the braking device based on the request value in accordance with the determined control mode.

According to the control device for the vehicle, the second deceleration control, in which the vehicle is decelerated by the braking device, can be initiated before the request value in the first deceleration control, in which the vehicle is decelerated by the drive device, reaches the limit request value. Thus, for example, when deceleration that can be achieved by the first deceleration control only is shifted to deceleration that requires the second deceleration control, a rapid change in the deceleration (acceleration) of the vehicle is likely to be suppressed. In addition, according to the control device for the vehicle, the braking preparation control, in which the braking device is brought into the preparation state, can be initiated before the request value in the first deceleration control reaches the limit request value. Thus, such effects can be acquired that a response delay of the braking device is shortened and that the rapid change in the acceleration upon switching to acceleration control can be suppressed, for example.

In the control device for the vehicle, for example, the control mode determination unit selects the first control mode in the case where a reduction at a reduction rate of the request value as an input value per unit time is more rapid than a reduction by a specified reduction rate threshold, and selects the second control mode in the case where the reduction at the reduction rate is more gradual than the reduction by the reduction rate threshold.

In the case where a magnitude of a reduction in the reduction rate of the request value is gradual, the control is more frequently switched to the acceleration control than the case where the magnitude of the reduction in the reduction rate of the request value is rapid. In addition, in the case where the magnitude of the reduction in the reduction rate of the request value is rapid, the deceleration control by the braking device is more likely to be required than the case where the magnitude of the reduction in the reduction rate of the request value is gradual. Thus, according to the control device for the vehicle, for example, the deceleration control can easily be executed in the control mode that is suited for the magnitude of the reduction rate of the request value, and the rapid change in the deceleration is more likely to be suppressed.

In the control device for the vehicle, for example, the control mode determination unit can determine the control mode after the second control mode to one of a third control mode and a fourth control mode, in the third control mode, the second deceleration control is executed after a lapse of a first threshold period from initiation of the braking preparation control in the second control mode, and in the fourth control mode, the second deceleration control is executed before the lapse of the first threshold period from the initiation of the braking preparation control in the second control mode, and the operation amount calculation unit can output an operation amount that is acquired by adding a first operation amount by feedforward control and a second operation amount by feedback control, and, in the fourth control mode, prohibits addition of the second operation amount before a lapse of a second threshold period from initiation of the fourth control mode.

In the case where the feedback control is initiated in a state where a period required for braking preparation is short, a rapid change in the deceleration of the vehicle possibly occurs due to a rapid increase in a hydraulic pressure or the like. In regard to this point, in the control device for the vehicle, in the case where the period required for the braking preparation is shorter than the first threshold period, the feedback control is prohibited for the second threshold period from the initiation of the second deceleration control by the braking device. Thus, the rapid change in the deceleration of the vehicle is likely to be suppressed, for example.

DESCRIPTION OF EMBODIMENT

Hereinafter, an exemplary embodiment of the present invention is disclosed. Each of a configuration of the embodiment, which will be described below, action and a results (effects) brought by the configuration is merely one example. The present invention can be realized by a configuration other than that disclosed in the following embodiment. In addition, according to the present invention, it is possible to obtain at least one of the various effects (including derivative effects) obtained by the configuration.

<Overview of Control Device>

Figure 1:
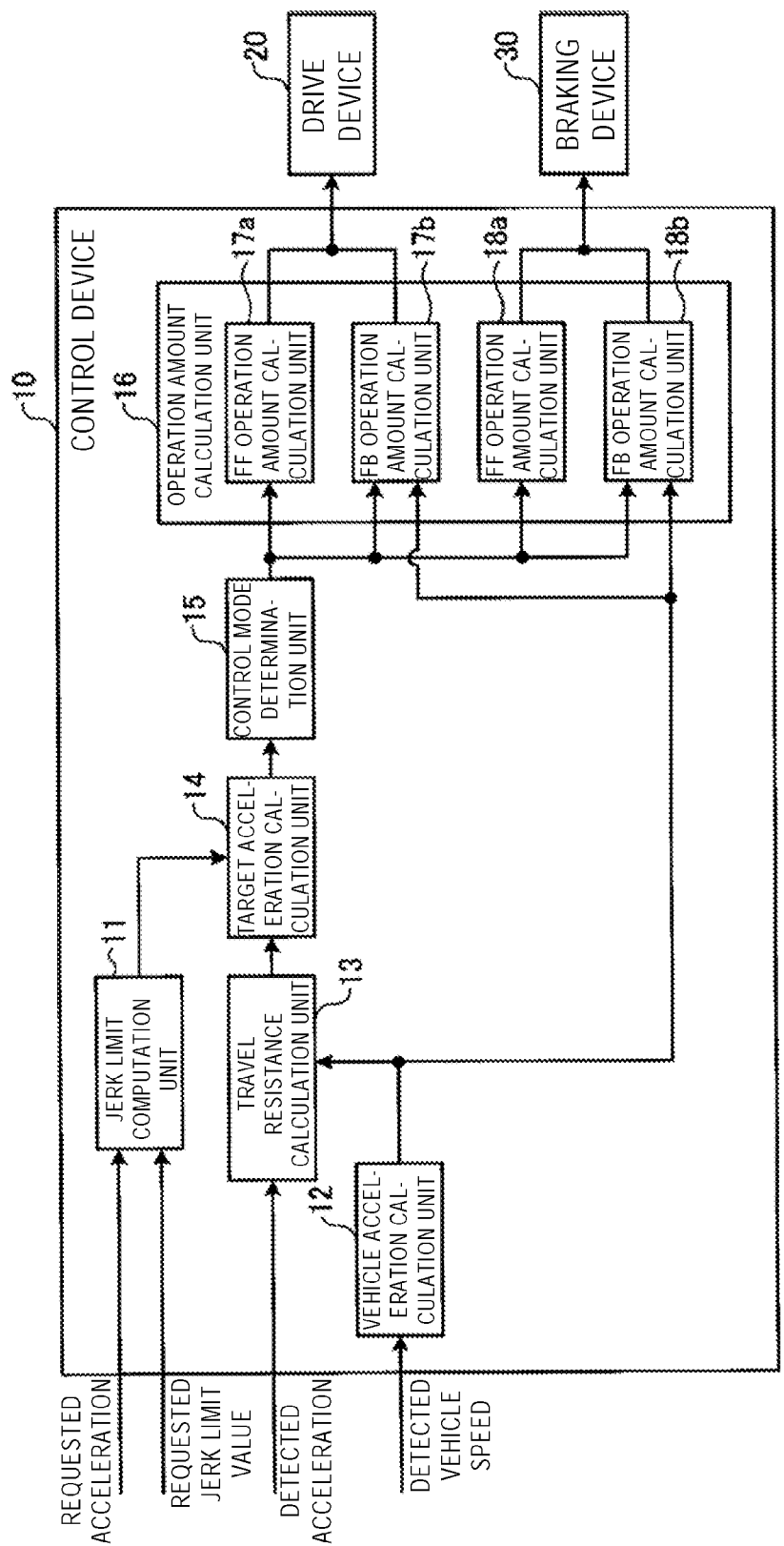
FIG. 1 is an exemplary and schematic block diagram of a vehicle control device in an embodiment.

FIG. 1 is a block diagram of a control device 10. As exemplified in FIG. 1, the control device 10 has a jerk limit computation unit 11, a vehicle acceleration calculation unit 12, a travel resistance calculation unit 13, a target acceleration calculation unit 14, a control mode determination unit 15, an operation amount calculation unit 16, and the like. Note that a dimension of each value computed in the control device 10 may be acceleration or torque, or may be converted in the middle of the computation.

The jerk limit computation unit 11 corrects received requested acceleration on the basis of a received requested jerk limit value when necessary. Jerk (jolt, a change rate of the acceleration) is a time derivative of the acceleration. That is, the requested jerk limit value is a limit of the requested acceleration with respect to the time derivative, in other words, a limit of a degree of a change in a current value of the requested acceleration with respect to a previous value thereof. Note that each of a requested acceleration value and the requested jerk limit value is received from a preceding or higher device or computation unit, or the like that determines the requested acceleration or the like in accordance with a travel state, a driving state, a drive state, peripheral environment, and the like.

The vehicle acceleration calculation unit 12 calculates longitudinal acceleration of the vehicle on the basis of a detection result of a sensor, for example, from a detected vehicle speed that is based on a detection result of a wheel speed sensor.

The travel resistance calculation unit 13 calculates travel resistance of the vehicle on the basis of a detection result of a sensor. The travel resistance calculation unit can calculate the travel resistance such as gradient resistance and air resistance by a known method. For example, the travel resistance calculation unit 13 can calculate the gradient resistance from vehicle vertical acceleration, the vehicle longitudinal acceleration, and the like that are based on a detection result of an acceleration sensor, and can calculate the air resistance from the detected vehicle speed that is based on the detection result of the wheel speed sensor, and the like.

The target acceleration calculation unit 14 calculates target acceleration from the requested acceleration, which is output from the jerk limit computation unit 11, and the travel resistance, which is output from the travel resistance calculation unit 13. The acceleration of the vehicle is reduced due to action of the travel resistance. Thus, in order to acquire the acceleration near the requested acceleration, the target acceleration calculation unit 14 adds a compensation value, which compensates for the travel resistance, to the requested acceleration so as to calculate the target acceleration.

The control mode determination unit 15 determines allocations (a ratio) of the target acceleration (an operation amount), which is calculated by the target acceleration calculation unit 14, to a drive device 20 and a braking device 30. For example, in the case where braking control is executed, the control mode determination unit 15 determines allocations (a ratio) of either one of an acceleration reduction amount by engine braking as the drive device 20 and an acceleration reduction amount by motor regeneration as the drive device 20 and an acceleration reduction amount by braking performed by the braking device 30. The control mode determination unit 15 also determines a ratio between the operation amount in feedforward control and the operation amount in feedback control.

The operation amount calculation unit 16 calculates the operation amounts input to the drive device 20 and the braking device 30 on the basis of the allocations determined by the control mode determination unit 15. The operation amount calculation unit 16 has a feedforward (FF) operation amount calculation unit 17a, a feedback (FB) operation amount calculation unit 17b, an FF operation amount calculation unit 18a, and an FB operation amount calculation unit 18b. The FF operation amount calculation unit 17a calculates a feedforward operation amount input to the drive device 20. The FB operation amount calculation unit 17b calculates a feedback operation amount input to the drive device 20. The FF operation amount calculation unit 18a calculates a feedforward operation amount input to the braking device 30. The FB operation amount calculation unit 18b calculates a feedback operation amount input to the braking device 30. Each of the FB operation amount calculation units 17b, 18b calculates the operation amount on the basis of a known feedback control method such that a deviation between the target acceleration and the vehicle acceleration (the detection value, the control amount) is reduced.

The control device 10 is an electronic control unit (ECU), for example. The control device 10 may be incorporated in an ECU of any system mounted on the vehicle, or may be the independent ECU. The control device 10 can have a central processing unit (CPU), a controller, random access memory (RAM), read only memory (ROM), flash memory (non-volatile memory), and the like, which are not illustrated. The control device 10 executes processing in accordance with a program that is installed and loaded, and can thereby realize each function. In this case, due to execution of the processing in accordance with the program, the control device 10 can function as the jerk limit computation unit 11, the vehicle acceleration calculation unit 12, the travel resistance calculation unit 13, the target acceleration calculation unit 14, the control mode determination unit 15, the operation amount calculation unit 16, and the like. The program is installed in the ROM, the flash memory, or the like. Note that at least some of the functions of the above units may be realized by hardware such as an application specific integrated circuit (ASIC), a field programmable gate array (FPGA), a digital signal processor (DSP), or a programmable logic device (PLD).

Figure 2:
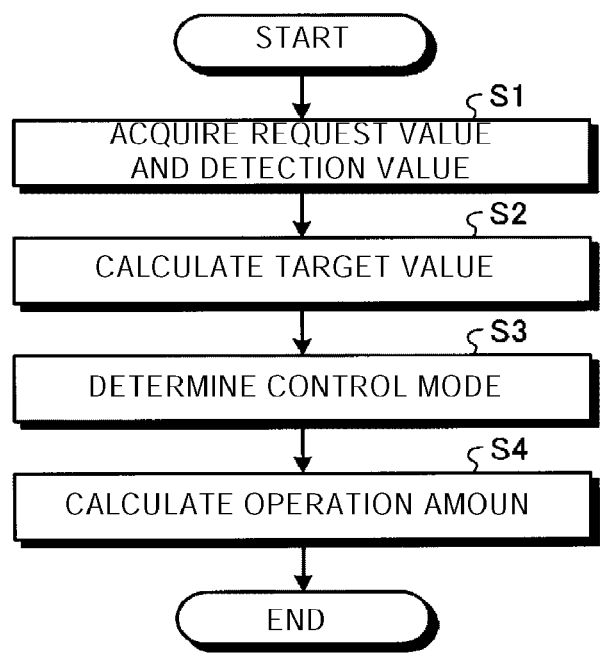
FIG. 2 is an exemplary flowchart illustrating a procedure of deceleration control by the vehicle control device in the embodiment.

FIG. 2 is a flowchart illustrating an example of a procedure of computation processing that is executed by the control device 10 during deceleration control of the vehicle in automatic driving. As illustrated in FIG. 2, the control device 10 acquires the request values and the detection values (S1), calculates a target value (the target acceleration) (S2), determines a control mode of the deceleration control (S3), and calculates the operation amount (S4). In this embodiment, as described above, as an example, in S1, the jerk limit computation unit 11 acquires the request values such as the requested acceleration and the requested jerk limit value. In S2, the target acceleration calculation unit 14 calculates the target acceleration as the target value. The target acceleration calculation unit 14 can also be referred to as a target value calculation unit. In S3, the control mode determination unit 15 determines the control mode. The control mode determination unit 15 is an example of the control mode determination unit. In S4, the operation amount calculation unit 16 calculates the operation amount.

<Types of Control and Control Modes>

In regard to the deceleration control of the vehicle during the automatic driving, the control device 10 can execute any of the following three types of the deceleration control.

(1) The deceleration control by the drive device 20 (first deceleration control)

(2) The deceleration control by the braking device 30 (second deceleration control)

(3) Braking preparation control to bring the braking device 30 into a preparation state, in which the braking preparation control is control that brings the braking device 30 into a braking preparation state and is also referred to as pre-charging, preliminary pressurization, or preliminary braking. More specifically, the braking preparation control is control of an electric pump. In the control of the electric pump, the electric pump for supplying hydraulic oil in a hydraulic system of the braking device 30 is operated to produce a relatively low hydraulic pressure (a preliminary pressure) that corresponds to passage resistance of a flow of the hydraulic oil in a master cylinder. Then, before the braking device 30 starts full-fledged braking, the hydraulic system is filled with the hydraulic oil so as to eliminate a space between a pad and either one of a disc and a rotor in the braking device 30 in advance. Responsiveness of the braking device 30 is improved by executing the braking preparation control.

In addition, in regard to the deceleration control of the vehicle during the automatic driving, the control device 10 can selectively execute one of the following two control modes, in each of which the above three types of the deceleration control are combined.

(First Control Mode)

A first control mode is a control mode in which only the first deceleration control by the drive device 20 is executed first and, before arrival of limit time, the second deceleration control by the braking device 30 is initiated in addition to the first deceleration control. Here, the limit time is time at which the request value reaches a limit request value in the case where the vehicle is decelerated by the first deceleration control only, and the limit request value corresponds to lower limit acceleration or torque that can be realized by the first deceleration control.

(Second Control Mode)

A second control mode is a control mode in which only the first deceleration control by the drive device 20 is executed first and, before the arrival of the limit time, the braking preparation control, which brings the braking device 30 into the preparation state, is initiated in addition to the first deceleration control.

The control device 10 can select one of the first control mode and the second control mode on the basis of a change in the request value over time. More specifically, in the case where a reduction rate of the request value per unit time (a reduction rate over time) is equal to or more rapid than a specified threshold (a reduction rate threshold), that is, in a situation where the relatively rapid deceleration is requested, the control device 10 executes the deceleration control in the first control mode, in which the first deceleration control by the drive device 20 is shifted to the second deceleration control by the braking device 30 without interposing the braking preparation control therebetween. Meanwhile, in the case where the reduction rate of the request value per unit time is more gradual than the reduction rate threshold, that is, in a situation where the relatively gradual deceleration is requested, the control device 10 executes the deceleration control in the second control mode, in which the first deceleration control by the drive device 20 is shifted to the braking preparation control for bringing the braking device 30 into the preparation state.

Furthermore, after the above second control mode, the control device 10 can selectively execute one of the following two control modes.

(Third Control Mode)

A third control mode is a control mode that allows control by both of the feedforward control and the feedback control in the second deceleration control by the braking device 30.

(Fourth Control Mode)

A fourth control mode is a control mode that only allows the feedforward control, that is, prohibits the feedback control before a specified period (a second threshold period) elapses from the initiation of the second deceleration control by the braking device 30 in the second deceleration control by the braking device 30. After a lapse of a second threshold period, the control by both of the feedforward control and the feedback control is allowed.

The control device 10 selects one of the third control mode and the fourth control mode on the basis of duration of a period in which the braking preparation control (the pre-charging) is actually executed in the second control mode. More specifically, in the control device 10, a known threshold period (the first threshold period) that is required to complete the pre-charging is set in advance. In the case where the period in which the pre-charging is actually executed (a pre-charging period) is longer than the first threshold period, that is, in a situation where the completion of the pre-charging is assumed, the control device 10 executes the deceleration control in the third control mode, in which the execution of the feedback control is not prohibited at the start of the deceleration control by the braking device 30. Meanwhile, in the case where the pre-charging period is equal to or shorter than the first threshold period, that is, in a situation where the pre-charging is possibly insufficient, the control device 10 executes the deceleration control in the fourth control mode in which the execution of the feedback control is prohibited at the start of the deceleration control by the braking device 30. In the case where the deceleration control by the feedback control is initiated in the braking device 30 in the situation where the pre-charging is insufficient, the relatively rapid change in the deceleration (the acceleration) possibly occurs. According to this embodiment, occurrence of such an inconvenient phenomenon can be avoided by switching the control mode on the basis of the duration of the pre-charging period, for example.

Figure 3:
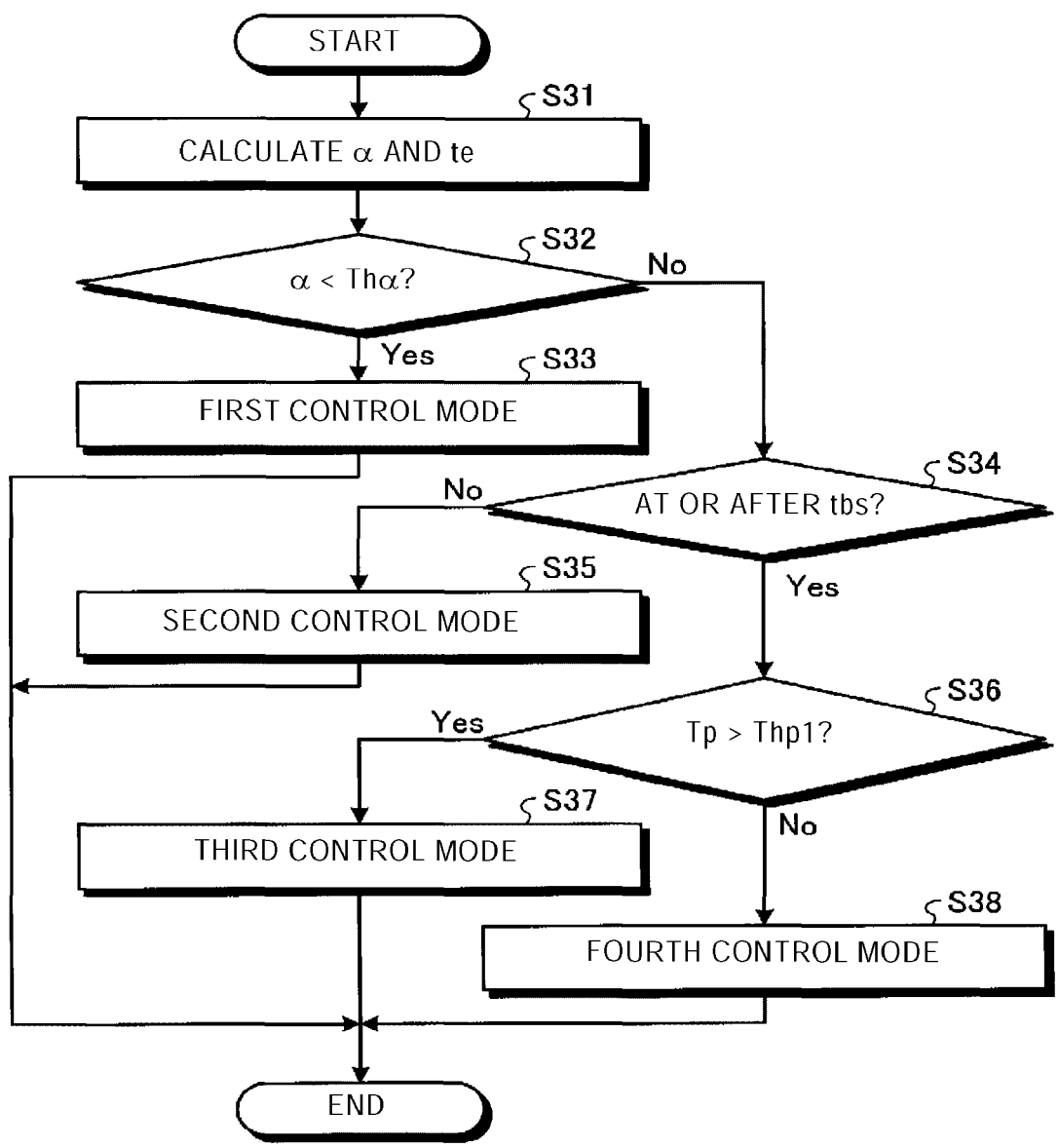
FIG. 3 is an exemplary flowchart illustrating a procedure of determining a control mode in the deceleration control by the vehicle control device in the embodiment.
Figure 4:
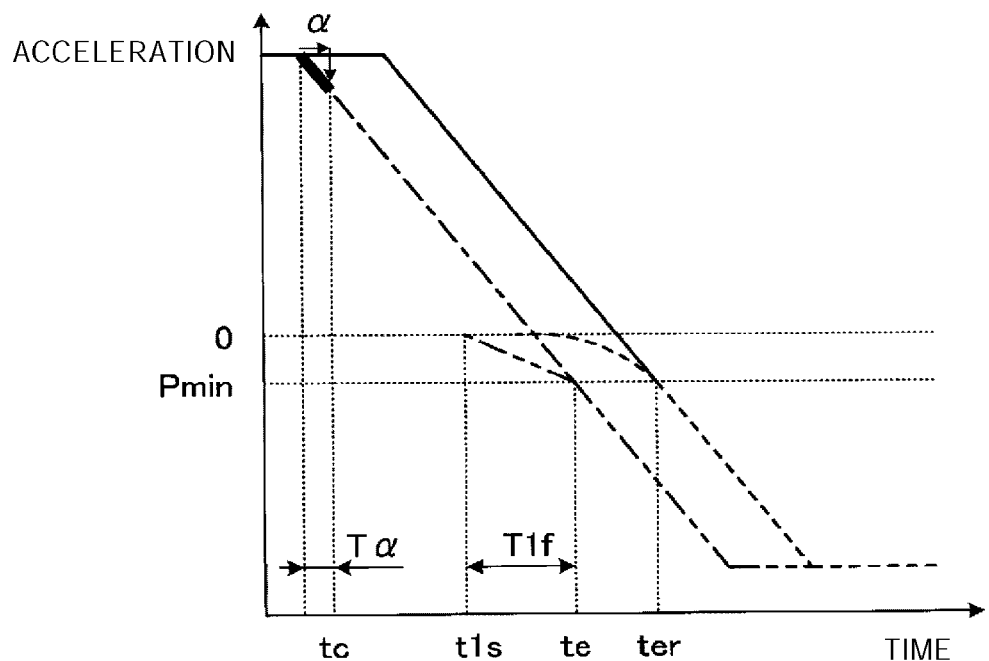
FIG. 4 is a graph illustrating an example of changes in an acceleration request value and actual acceleration over time in the deceleration control by the vehicle control device in the embodiment.
Figure 5:
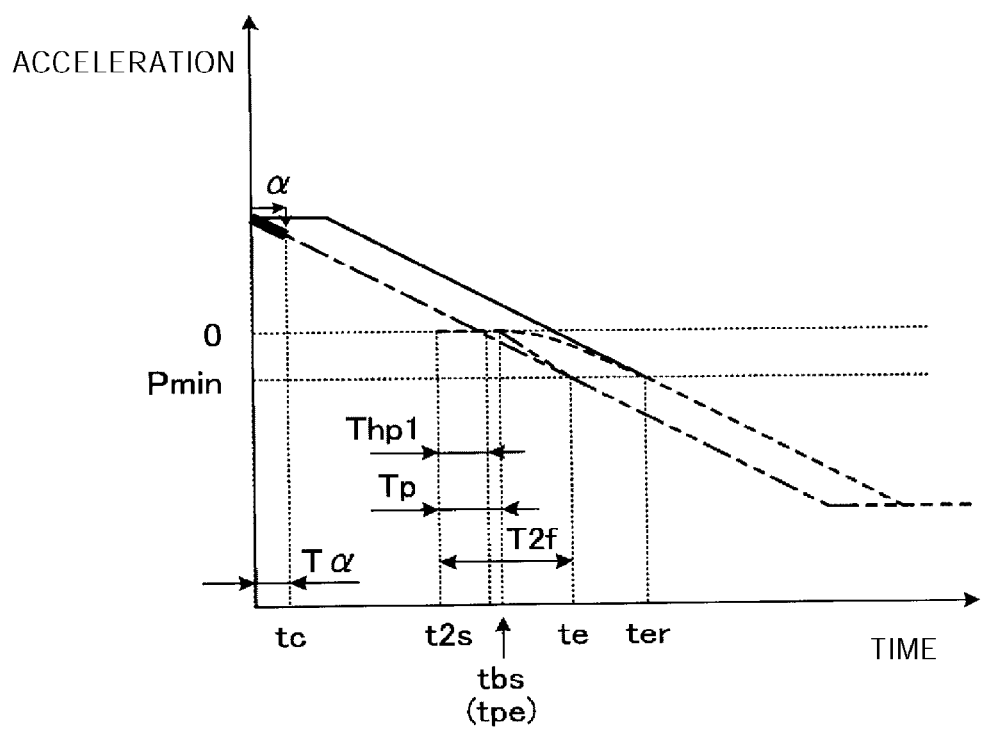
FIG. 5 is a graph illustrating another example of the changes in the acceleration request value and the actual acceleration over time in the deceleration control by the vehicle control device in the embodiment.

FIG. 3 is a flowchart illustrating an example of a procedure (logic) of determining the above-described control mode in the case where the deceleration control is executed during the automatic driving. FIG. 4 is a graph illustrating an example of changes in request torque and actual torque over time, and FIG. 5 is a graph illustrating another example of the changes in the request torque and the actual torque over time in the case where the reduction rate of the request torque is lower than that in FIG. 4.

In this embodiment, the control mode determination unit 15 executes the computation processing illustrated in FIG. 3. As illustrated in FIG. 3, the control mode determination unit 15 calculates a reduction rate $\alpha$ of the request value of the acceleration or the torque over time (a change rate over time) (S31). In this embodiment, the acceleration request value has a positive value on the acceleration side and has a negative value on the deceleration side, and the torque request value has a positive value on the acceleration side of the torque and has a negative value on the deceleration side of the torque. For example, as illustrated in FIGS. 4 and 5, the reduction rate $\alpha$ over time is calculated on the basis of the change of the request value over time in a period T$\alpha$ (a computation period) of specified duration before time tc (current time) at which the calculation is performed. The reduction rate $\alpha$ over time can be a value that is acquired by dividing a change amount of the request value in the period T$\alpha$ by the period T$\alpha$ (time), for example. Reference signs of the reduction rate $\alpha$ over time are set to differ between the reduction and the increase of the request value. In this embodiment, the reduction rate $\alpha$ over time is treated to have a positive sign on the increase side and have a negative sign on the reduction side. That is, as the change to the reduction side is increased, the reduction rate $\alpha$ over time acquires a large numerical value on the negative side, in other words, a negative value that is significantly deviated from zero. In addition, the control mode determination unit 15 calculates time te (the limit time) on the basis of the reduction rate $\alpha$ over time (S31). At the time te, the request value reaches a limit request value Pmin (a lower limit value, a lower limit acceleration request value, a lower limit torque request value) corresponding to lower limit acceleration or torque that can be achieved by the first deceleration control. The limit request value Pmin is a known value and is set in advance. The control mode determination unit 15 can calculate the limit time te, at which the request value becomes the limit request value Pmin, when assuming that the request value is linearly reduced, that is, the request value is a linear function of the time, for example. Note that each of the reduction rate $\alpha$ over time and the limit time te may be calculated by another known regression method or the like. The control mode determination unit 15 is an example of the prediction unit.

Next, the control mode determination unit 15 compares the reduction rate $\alpha$ over time with a reduction rate threshold Th$\alpha$ so as to select the first control mode and the second control mode (S32). If the reduction rate $\alpha$ over time is lower than the reduction rate threshold Th$\alpha$, that is, if the reduction is rapid, the control mode determination unit 15 selects the first control mode (S33). On the other hand, if the reduction rate $\alpha$ over time is equal to or higher than the reduction rate threshold Th$\alpha$, that is, if the reduction is gradual and, in a state where the second deceleration control by the braking device 30 that is based on the reduction in the request value is not required, that is, if the current time is prior to initiation time tbs of the second deceleration control (No in S34), the control mode determination unit 15 selects the second control mode (S35).

If Yes in S34, the second deceleration control by the braking device 30 is required on the basis of the reduction in the request value. Then, if the second deceleration control is initiated, that is, if the current time is later than the initiation time tbs of the second deceleration control (Yes in S34), the control mode determination unit 15 compares a period Tp, in which the pre-charging is actually executed (the pre-charging period) in the braking preparation control, with a threshold period Thp1 (the first threshold period) (S36). The braking preparation control is executed before the second deceleration control and brings the braking device 30 into the preparation state. If the pre-charging period Tp is longer than the first threshold period Thp1 (Yes in S36), the control mode determination unit 15 selects the third control mode (S37). If the pre-charging period Tp is equal to shorter than the first threshold period Thp1 (No in S36), the control mode determination unit 15 selects the fourth control mode (S38).

<Control Example (1), First Control Mode>

FIG. 4 illustrates the example of the changes in the acceleration request value and the actual acceleration over time in the case where the first control mode is executed. In FIG. 4, a one-dot chain line represents the acceleration request value to the drive device 20, a bold solid line represents the actual acceleration of the vehicle based on actuation of the drive device 20, a two-dot chain line represents the acceleration request value to the braking device 30, and a bold broken line represents the actual acceleration of the vehicle based on actuation of the braking device 30.

The control mode determination unit 15 calculates the limit time te, at which the request value reaches the limit request value Pmin, from the reduction rate $\alpha$ of the request value over time. Furthermore, the control mode determination unit 15 calculates time t1s that is earlier than the limit time te by a period T1f. The time t1s is time at which the second deceleration control by the braking device 30 is initiated.

The operation amount calculation unit 16 first executes the first deceleration control by the drive device 20. That is, from the current time tc to the limit time te, the operation amount calculation unit 16 reduces the acceleration operation amount, which is input to the drive device 20, in accordance with the reduction in the request value of the torque or the acceleration indicated by the one-dot chain line in FIG. 4. Corresponding to this, as indicated by the bold solid line, the actual acceleration of the vehicle based on the actuation of the drive device 20 is reduced in accordance with the reduction in the request value while a response delay to the request value occurs.

At the time t1s, the operation amount calculation unit 16 initiates the second deceleration control by the braking device 30. That is, from the time t1s, the operation amount calculation unit 16 increases the deceleration operation amount, which is input to the braking device 30, in accordance with the reduction in the request value of the torque or the acceleration indicated by the two-dot chain line in FIG. 4. Corresponding to this, as indicated by the bold solid line, the actual acceleration of the vehicle based on the actuation of the braking device 30 is reduced in accordance with the reduction in the request value while the response delay to the reduction in the request value occurs.

In this embodiment, as illustrated in FIG. 4, in the period from the time t1s to the limit time te, the operation amount calculation unit 16 concurrently executes the first deceleration control by the drive device 20 and the second deceleration control by the braking device 30. Just as described, the second deceleration control by the braking device 30 is initiated at the time t1s prior to the limit time te, and is concurrently executed with the first deceleration control by the drive device 20. In this way, at actual limit time ter at which the deceleration by the drive device 20 is no longer possible, the braking device 30 can execute the deceleration that corresponds to the reduction in the request value without causing the significant response delay from the actual limit time ter. Thus, according to this embodiment, it is possible to further reduce the change in the acceleration (the deceleration) upon switching of a primary body that governs the deceleration of the vehicle from the drive device 20 to the braking device 30.

Note that FIG. 4 schematically illustrates an example of a change in each parameter over time and each of the parameters is predicted at the time tc (the current time) in FIG. 4. Thus, FIG. 4 does not illustrate the actual change in each of the parameters over time. The above-described computation is performed in every specified time step, for example, and each of the parameters is updated in every step. In addition, the period T1f from the time t1s to the limit time te, that is, duration of the period in which the concurrent control is executed, the allocations (the ratio) of the operation amount input to the drive device 20 and the braking device 30 in the period, the change in the operation amount over time can each be determined in advance on the basis of an experiment, an analysis, a simulation, or the like. The distributions of and the change in the operation amount over time can also appropriately be changed in accordance with a magnitude of the reduction rate α of the request value over time, the detection values of the various sensors indicative of the travel state, and the like.

<Control Example (2), Second Control Mode>

FIG. 5 illustrates another example of the changes in the acceleration request value and the actual acceleration over time in the case where the second control mode is executed. In FIG. 5, a one-dot chain line represents the acceleration request value to the drive device 20, a bold solid line represents the actual acceleration of the vehicle based on the actuation of the drive device 20, a two-dot chain line represents the acceleration request value to the braking device 30, and a bold broken line represents the actual acceleration of the vehicle based on the actuation of the braking device 30.

The control mode determination unit 15 calculates the limit time te, at which the request value reaches the limit request value Pmin, from the reduction rate α of the request value over time. Furthermore, the control mode determination unit 15 calculates time t2s that is earlier than the limit time te by a period T2f. The time t2s is time at which the braking preparation control of the braking device 30 is initiated.

Also, in the second control mode, the control mode determination unit 15 calculates the time tbs, at which the second deceleration control by the braking device 30 is initiated. The time tbs is time that is earlier than the limit time te by a specified period. In addition, in a situation where a difference between the current time tc and the limit time te is greater than a specified threshold, the time tbs is set to be later than time at which the first threshold period Thp1 has elapsed from the time t2s such that the second deceleration control by the braking device 30 is initiated after the completion of the pre-charging. As described above, the first threshold period Thp1 is the known period that is required for the completion of the pre-charging.

The operation amount calculation unit 16 first executes the first deceleration control by the drive device 20. That is, from the current time tc to the limit time te, the operation amount calculation unit 16 reduces the acceleration operation amount, which is input to the drive device 20, in accordance with the reduction in the request value of the torque or the acceleration indicated by the one-dot chain line in FIG. 5. Corresponding to this, as indicated by the bold solid line, the actual acceleration of the vehicle based on the actuation of the drive device 20 is reduced in accordance with the reduction in the request value while the response delay to the reduction in the request value occurs.

At the time t2s, the operation amount calculation unit 16 initiates the braking preparation control of the braking device 30. That is, as indicated by the two-dot chain line in FIG. 5, at the time t2s, the operation amount calculation unit 16 inputs the operation amount to the braking device 30 for the execution of the braking preparation control. The braking preparation control continues from the time tbs until the second deceleration control by the braking device 30 is initiated.

At the time tbs, the operation amount calculation unit 16 initiates the second deceleration control by the braking device 30. That is, from the time tbs, the operation amount calculation unit 16 increases the deceleration operation amount, which is input to the braking device 30, in accordance with the reduction in the request value of the torque or the acceleration indicated by the two-dot chain line in FIG. 5. Corresponding to this, as indicated by the bold broken line, the actual acceleration of the vehicle based on the actuation of the braking device 30 is reduced in accordance with the reduction in the request value while the response delay to the reduction in the request value occurs.

In a period from the time t2s to the time tbs, the operation amount calculation unit 16 concurrently executes the first deceleration control by the drive device 20 and the braking preparation control of the braking device 30. Then, in a period from the time tbs to the limit time te, the operation amount calculation unit 16 concurrently executes the first deceleration control by the drive device 20 and the second deceleration control by the braking device 30. Just as described, the braking preparation control of the braking device 30 is initiated at the time t2s before reaching the limit time te, and is concurrently executed with the first deceleration control by the drive device 20. In this way, the response delay of the braking device 30 can be reduced. In addition, in the case where the reduction rate α over time is relatively low, the request value is more frequently switched from the deceleration to the acceleration than the case where the change rate α over time is relatively high. In the case where the reduction rate α over time is relatively high, the second deceleration control by the braking device 30 is more frequently executed than the case where the change rate α over time is relatively low. Thus, according to this embodiment, the further smooth deceleration control can be executed in the further appropriate control mode.

FIG. 5 exemplifies the change in each of the parameters over time in the third control mode in which the actual pre-charging period Tp is longer than the first threshold period Thp1. In regard thereto, for example, in the case where the reduction rate α of the request value over time is increased during the pre-charging, the control mode determination unit 15 quickens the limit time to and also quickens the initiation time tbs of the second deceleration control by the braking device 30. In such a case, the actual pre-charging period Tp possibly becomes shorter than the first threshold period Thp1. As described above, in the case where the actual pre-charging period Tp is shorter than the first threshold period Thp1, the control mode determination unit 15 selects the fourth control mode and prohibits the output of the operation amount by the feedback control for a certain period (the second threshold period) from the time tbs. In this way, in the situation where pre-charging is insufficient, it is possible to avoid a situation where the deceleration control by the feedback control is initiated by the braking device 30, which results in the relatively rapid change in the deceleration (the acceleration).

As illustrated in FIG. 5, in this embodiment, regardless of whether the third control mode or the fourth control mode is selected after the second control mode, upon the arrival of the actual limit time ter, at which the deceleration by the drive device 20 is no longer possible, the braking device 30 can execute the deceleration that corresponds to the reduction in the request value from the actual limit time ter without causing the significant response delay. Thus, according to this embodiment, it is possible to further reduce the change in the acceleration (the deceleration) upon switching of the primary body, which governs the deceleration of the vehicle, from the drive device 20 to the braking device 30.

Note that FIG. 5 schematically illustrates the example of the change in each of the parameters over time and each of the parameters is predicted at the time tc (the current time) in FIG. 5. Thus, FIG. 5 does not illustrate the actual change in each of the parameters over time. The above-described computation is performed in every specified time step, for example, and each of the parameters is updated in every step. In addition, the period T2f from the time t2s to the limit time te, that is, the duration of the period in which the concurrent control is executed, the allocations (the ratio) of the operation amount input to the drive device 20 and the braking device 30 after the time tbs and the time t2s, and the change in the operation amount over time can each be determined in advance on the basis of the experiment, the analysis, the simulation, or the like. The distributions of and the change in the operation amount over time can also appropriately be changed in accordance with the magnitude of the reduction rate α of the request value over time, the detection values of the various sensors indicative of the travel state, and the like.

As it has been described so far, according to the control device 10 of this embodiment, the second deceleration control, in which the vehicle is decelerated by the braking device 30, can be initiated before the request value in the first deceleration control, in which the vehicle is decelerated by the drive device 20, reaches the limit request value. Thus, for example, when the deceleration that can be achieved by the first deceleration control only is shifted to the deceleration that requires the second deceleration control, the rapid change in the deceleration (the acceleration) of the vehicle is likely to be suppressed. In addition, according to the control device 10, the braking preparation control, in which the braking device 30 is brought into the preparation state, can be initiated before the request value in the first deceleration control reaches the limit request value. Thus, such effects can be acquired that the response delay of the braking device 30 is shortened and that the rapid change in the acceleration upon switching to the acceleration control can be suppressed, for example.

Furthermore, according to the control device 10 of this embodiment, the further appropriate control mode is selected from the first control mode and the second control mode in accordance with the magnitude of the reduction rate of the request value, for example. Thus, the rapid change in the deceleration can further be suppressed, for example.

Moreover, according to the control device 10 of this embodiment, in the case where a period required for the braking preparation is shorter than the first threshold period Thp1, the feedback control is prohibited for the second threshold period from the initiation of the second deceleration control by the braking device 30. Thus, the rapid change in the deceleration of the vehicle is likely to be suppressed, for example.

The embodiment of the present invention has been exemplified so far. The above embodiment is merely provided as an example and thus has no intention of limiting the scope of the invention. The above embodiment can be implemented in any of various other modes, and various types of elimination, replacement, and changes can be made thereto within the scope that does not depart from the gist of the invention. In addition, each of the components, the numerical values, the conditions, and the like can appropriately be changed for implementation.

The invention claimed is:

1. A control device for a vehicle capable of executing first deceleration control, in which the vehicle is decelerated by a drive device, second deceleration control, in which the vehicle is decelerated by a braking device, and braking preparation control, in which the braking device is brought into a preparation state, in the case where deceleration control of the vehicle is executed in accordance with a reduction in a request value indicative of a degree of longitudinal acceleration of the vehicle, the control device for the vehicle comprising:

a prediction unit that predicts limit time at which the request value reaches a limit request value corresponding to lower limit acceleration or torque that can be achieved by the first deceleration control when the vehicle is decelerated by the first deceleration control only on the basis of a change of the request value over time;

a control mode determination unit that determines a control mode on the basis of the request value, the control mode determination unit selecting, as the control mode, one of a first control mode and a second control mode, in the first control mode, only the first deceleration control being executed and the second deceleration control being initiated in addition to the first deceleration control before arrival of the limit time, and in the second control mode, only the first deceleration control being executed and the braking preparation control being initiated in addition to the first deceleration control before the arrival of the limit time; and an operation amount calculation unit that calculates an operation amount of each of the drive device and the braking device based on the request value in accordance with the determined control mode.

2. The control device for the vehicle according to claim 1, wherein
the control mode determination unit selects the first control mode in the case where a reduction at a reduction rate of the request value per unit time is more rapid than a reduction by a specified reduction rate threshold, and selects the second control mode in the case where the reduction at the reduction rate is more gradual than the reduction by the reduction rate threshold.

3. The control device for the vehicle according to claim 1, wherein
the control mode determination unit can determine the control mode after the second control mode to one of a third control mode and a fourth control mode, in the third control mode, the second deceleration control is executed after a lapse of a first threshold period from initiation of the braking preparation control in the second control mode, and in the fourth control mode, the second deceleration control is executed before the lapse of the first threshold period from the initiation of the braking preparation control in the second control mode, and
the operation amount calculation unit can output an operation amount that is acquired by adding a first operation amount by feedforward control and a second operation amount by feedback control, and, in the fourth control mode, prohibits addition of the second operation amount before a lapse of a second threshold period from initiation of the fourth control mode.

4. The control device for the vehicle according to claim 2, wherein
the control mode determination unit can determine the control mode after the second control mode to one of a third control mode and a fourth control mode, in the third control mode, the second deceleration control is executed after a lapse of a first threshold period from initiation of the braking preparation control in the second control mode, and in the fourth control mode, the second deceleration control is executed before the lapse of the first threshold period from the initiation of the braking preparation control in the second control mode, and
the operation amount calculation unit can output an operation amount that is acquired by adding a first operation amount by feedforward control and a second operation amount by feedback control, and, in the fourth control mode, prohibits addition of the second operation amount before a lapse of a second threshold period from initiation of the fourth control mode.

5. A control device for a vehicle capable of executing first deceleration control, in which the vehicle is decelerated by a drive device, second deceleration control, in which the vehicle is decelerated by a braking device, and braking preparation control, in which the braking device is brought into a preparation state, in the case where deceleration control of the vehicle is executed in accordance with a reduction in a request value indicative of a degree of longitudinal acceleration of the vehicle, the control device for the vehicle comprising:

an electronic control unit configured to
predict limit time at which the request value reaches a limit request value corresponding to lower limit acceleration or torque that can be achieved by the first deceleration control when the vehicle is decelerated by the first deceleration control only on the basis of a change of the request value over time;
determine a control mode on the basis of the request value, by selecting, as the control mode, one of a first control mode and a second control mode, in the first control mode, only the first deceleration control being executed and the second deceleration control being initiated in addition to the first deceleration control before arrival of the limit time, and in the second control mode, only the first deceleration control being executed and the braking preparation control being initiated in addition to the first deceleration control before the arrival of the limit time; and
calculate an operation amount of each of the drive device and the braking device based on the request value in accordance with the determined control mode.

6. The control device for the vehicle according to claim 5, wherein
the electronic control unit selects the first control mode in the case where a reduction at a reduction rate of the request value per unit time is more rapid than a reduction by a specified reduction rate threshold, and selects the second control mode in the case where the reduction at the reduction rate is more gradual than the reduction by the reduction rate threshold.

7. The control device for the vehicle according to claim 5, wherein
the electronic control unit can determine the control mode after the second control mode to one of a third control mode and a fourth control mode, in the third control mode, the second deceleration control is executed after a lapse of a first threshold period from initiation of the braking preparation control in the second control mode, and in the fourth control mode, the second deceleration control is executed before the lapse of the first threshold period from the initiation of the braking preparation control in the second control mode, and
the electronic control unit can output an operation amount that is acquired by adding a first operation amount by feedforward control and a second operation amount by feedback control, and, in the fourth control mode, prohibits addition of the second operation amount before a lapse of a second threshold period from initiation of the fourth control mode.

8. The control device for the vehicle according to claim 6, wherein
the electronic control unit can determine the control mode after the second control mode to one of a third control mode and a fourth control mode, in the third control mode, the second deceleration control is executed after a lapse of a first threshold period from initiation of the braking preparation control in the second control mode, and in the fourth control mode, the second deceleration control is executed before the lapse of the first threshold period from the initiation of the braking preparation control in the second control mode, and the electronic control unit can output an operation amount that is acquired by adding a first operation amount by feedforward control and a second operation amount by feedback control, and, in the fourth control mode, prohibits addition of the second operation amount before a lapse of a second threshold period from initiation of the fourth control mode.

\* \* \* \* \*